Figure 5:
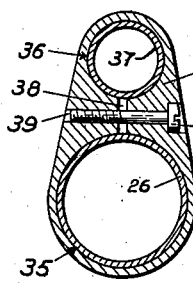

June 14, 1949.  J. R. DECKER  2,472,809
ILLUMINATED RETICLE ATTACHMENT FOR TELESCOPES
Filed Sept. 6, 1945  2 Sheets-Sheet 1
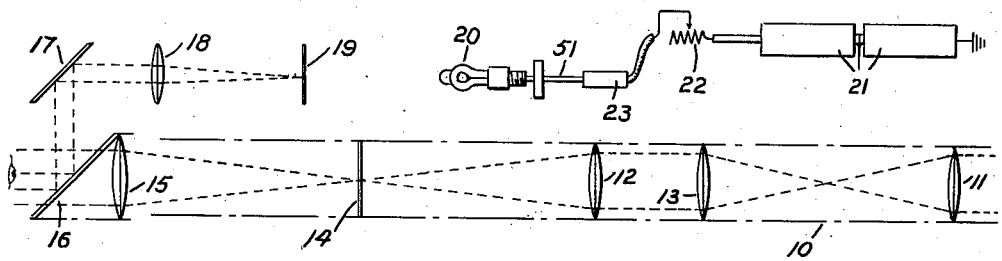
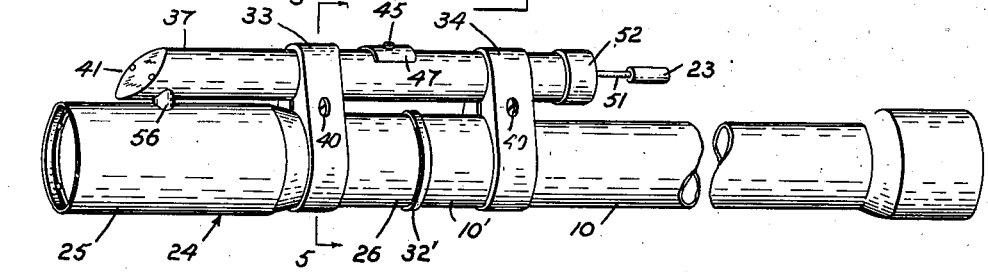
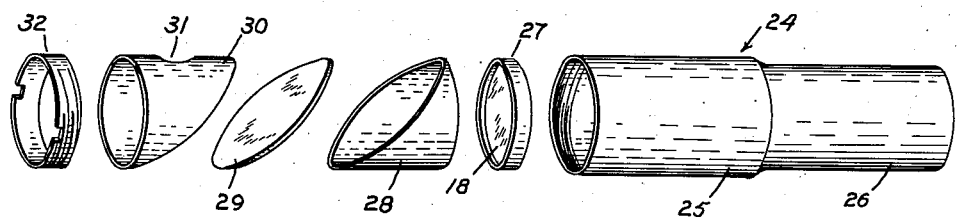
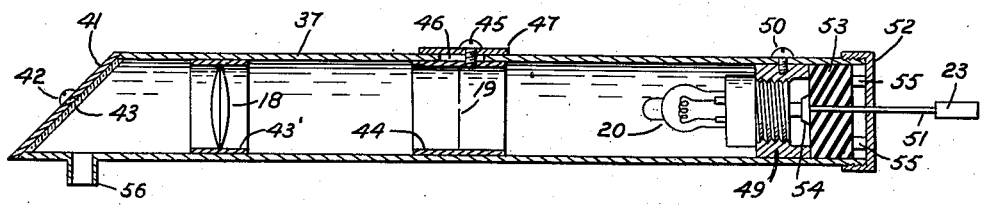
Inventor
John R. Decker June 14, 1949. J. R. DECKER 2,472,809
ILLUMINATED RETICLE ATTACHMENT FOR TELESCOPES
Filed Sept. 6, 1945 2 Sheets-Sheet 2

Inventor
John R. Decker

By J. H. Church & W. E. Thibodeau
Attorneys

Patented June 14, 1949

2,472,809

UNITED STATES PATENT OFFICE 2,472,809

ILLUMINATED RETICLE ATTACHMENT FOR TELESCOPES

John R. Decker, Amherst, Mass.

Application September 6, 1945, Serial No. 614,797

1 Claim. (Cl. 88—2.3)

(Granted under the act of March 3, 1883, as amended April 30, 1928; 370 O. G. 757)

The invention described herein may be manufactured and used by or for the Government for governmental purposes without the payment to me of any royalty thereon.

This invention relates to light-projecting means for providing an illuminated reticule for optical instruments, such as telescopes. More particularly, it is an object of the invention to provide a sighting telescope having means for projecting into the field of view thereof, a sharply-defined image of a reticle that is useful for any kind or type of direct-sighted gun when firing under conditions of poor visibility. The particular model selected for illustration is very useful for sniper's rifles.

It is one object of the invention to provide an attachment for optical sighting devices that may be quickly attached and detached and when attached, selectively used when desired.

Another object is to provide an illuminated reticle in the field of view of a sighting instrument that may be attached with a minimum number of structural changes in the instrument itself.

A further object is to provide an attachment in which the illuminated reticle, when used is superposed over and coincides with a conventional reticle in the telescope itself.

A still further object is the provision of an attachment, as aforesaid wherein the size, shape, and intensity or brightness of the projected reticle may be varied to suit the conditions of ambient light under which firing is being done.

Another object is to provide a reticle-projecting device for telescopes that is relatively simple and inexpensive to construct while at the same time durable, trouble-proof and fully enclosed and protected against shock and rough handling.

Other objects and advantages will become apparent as the description proceeds.

In the drawings:

Figure 1 is a schematic view of a sighting telescope with means for forming and projecting an illuminated reticle image into the field of view of a telescope.

Figure 6:
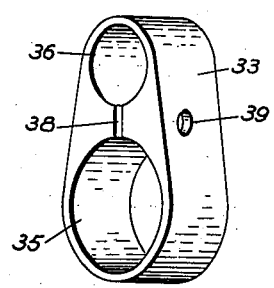
Figure 7:
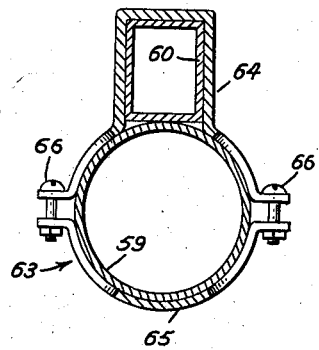
Figure 8:
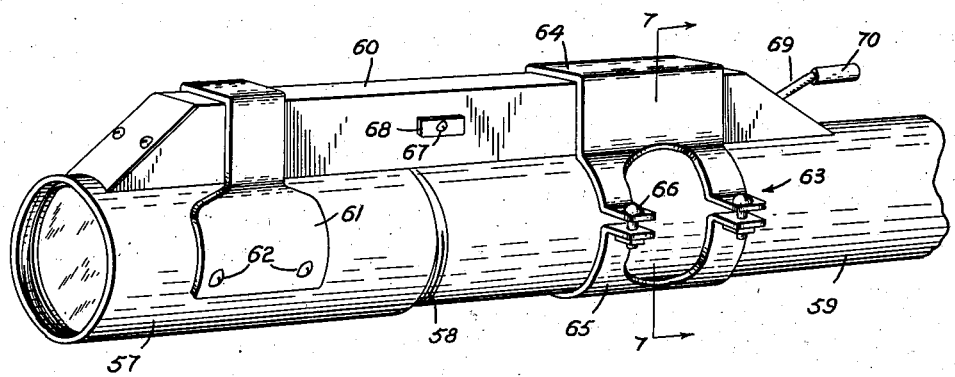
Figure 9:
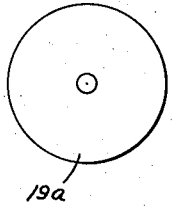
Figure 10:
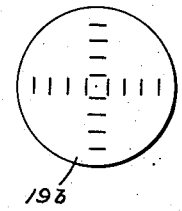
Figure 11:
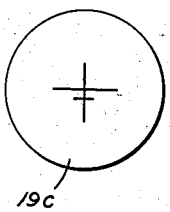
Figure 12:
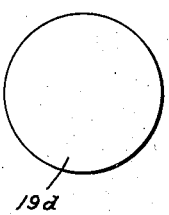

Figure 2 is a perspective view of a telescope intended more particularly for the aiming of guns and having attached thereto the improved collimator, Figure 3 is an exploded perspective view of the attachment for the ocular end of the telescope showing more particularly the means for locating and mounting the partial reflector element, Figure 4 is a central vertical cross section of the means for illuminating and projecting an image of the reticle, Figure 5 is a cross section taken upon the line 5—5, Figure 2, showing one of the two identical clamps used for securing the reticle projector to the telescope proper, Figure 6 is a perspective view of the clamp shown in Figure 5, Figure 7 is a cross sectional view of a slightly different form of attachment, taken upon the line 7—7 of Figure 8, Figure 8 is a perspective view of the form shown in cross section in Figure 7, and Figures 9 to 12, inclusive, are views showing different forms of reticles suitable for use with the invention.

Referring to the drawings, particularly to Figure 1, there is shown schematically the casing 10 of a telescope that may have an objective lens 11 inverter lenses 12 and 13 a reticle 14 and an ocular lens 15. At a position immediately in advance of lens 15 there is a partial reflector 16 which may consist of a partially-silvered or aluminized pane of transparent material arranged at 45° to the optical axis of casing 10. A total reflecting mirror or prism 17 is positioned above and parallel to reflector 16. A lens 18 is positioned between reflector 17 and a reticle 19 situated at a distance from 18 equal to the focal length thereof. This reticle may consist of an opaque disk having slots or openings cut therein to form an image of predetermined pattern; or it may consist of a transparent disk having lines formed thereon to create the desired pattern. A few of the forms suitable for use with the instrument are shown in Figures 9 to 12, inclusive, and are identified as 19a, 19b, 19c, and 19d, respectively. Form 19d is preferred and in use the central dot coincides with the regular cross-hair intersection while the second dot immediately below the central dot gives a definite elevation over the central dot for a predetermined increase in range.

Illumination of reticle 19 is provided by a small incandescent lamp 20 supplied with current from a pair of cells 21 through a circuit including a combined rheostat and switch 22 and a plug connector 23. Thus, when lamp 20 is lighted, lens 18 and reflectors 16 and 17 act to project an image of the pattern of reticle 19 into the field of view of the telescope. The adjustment is such that the aforesaid image appears in reflector 16 exactly superposed over the normally-used reticle 14 within casing 10. Thus under conditions of poor visibility as when shooting in semi-darkness or into a dark background, the shooter needs only to switch on lamp and properly adjust rheostat 22 to have an illuminated reticle that is plainly visible and that enables the gun to be accurately aimed at a point irrespective of the condition or intensity of ambient light.

Referring to Figures 2 and 3, the part of my invention attached to casing 10 comprises a cylindrical sleeve 24 having portions 25 and 26 of larger and smaller diameters. The outer end of portion 26 is internally threaded to engage the threaded outer portion 10′ of main casing 10. A ring 27 carrying lens 15 slidably fits within portion 25 and is held in engagement with the shoulder connecting portions 25 and 26 by a first section of tubing 28 that may consist of a material such as "Bakelite" and that is cut at an angle of 45° to the axis of the tube. Following tube section 28 is partial reflector 29 elliptical in shape and held against the 45° end of first tube section 28, by a second tube section 30. Section 30 may be a duplicate of section 28 except only that it is provided with a hole 31 at the top to permit entrance of light reflected from reflector 17. The parts are so proportioned and dimensioned that when parts 27, 28, 29 and 30 are inserted into the tube portion 25 in the order shown in Figure 3, collar 32 may be threaded into the end of said portion to engage the square-cut end of tube section 30 and force all of the parts into engagement whereby they are rigidly held in position with the major axis of the elliptical reflector 29 intersecting the optical axis of the light projector presently to be described. A locking collar 32′ is threaded on casing 10 in advance of portion 26 so that, when turned down against the end of said portion, sleeve 24 is locked in position with respect to said casing.

A pair of duplicate clamps 33 and 34 are employed to secure the reticle projecting apparatus to the telescope proper. Clamp 33 is shown in Figures 5 and 6 and will be noted to comprise a unitary section having parallel bores 35 and 36 therein to receive the tubes 10 and 37 of the respective casings. The material separating the bores is slotted as at 38 and a hole 39 is drilled between the two bores and intersecting the slot 38. One section of this hole is enlarged to slidably receive a cap screw 40 while the other section is tapped to threadedly engage said screw. Thus when the casing tubes are in position, tightening of the screws constricts the clamp and rigidly unites the tubes. As the two clamps are identical, a description of the other is unnecessary.

Referring to Figure 4, it will be noted that casing 37 is cut at one end at 45° to its longitudinal axis and that this end is closed by a plate 41 secured in place by screws 42. A mirror 43 is attached to plate 41 and is thus adapted to deflect the reticle image onto reflector 29. The lens 18 is mounted within a tube section 43′ secured in any convenient manner within casing 37. The reticle 19 is mounted within a tube section 44 slidably mounted within casing 37. A clamping screw 45 passes through an elongated slot 46 in casing 37 and threadedly engages section 44. An apertured cover plate 47 is shaped to fit casing 37 and to cover slot 46 so that when screw 45 is loosened, section 44 and plate 47 may be conjointly slid axially of casing 37 to thereby adjust reticle 19 into the focal plane of lens 18. When screw 45 is tightened, tube 44 is firmly clamped in adjusted position.

The lamp 20 is threaded into a socket 49, held in position within casing 37 by a screw 50. The conductor 51 passes through holes in an end cap 52 and an insulator plug 53 and terminates in a contact 54 engaging the central terminal of the lamp base. Leaf springs 55 act between cap 52 and plug 53 to urge the latter and contact 54 toward lamp 20.

It is contemplated that cells 21 may be mounted in a compartment such as a bore in the stock of the gun. Or a separate casing may be provided therefor and attachable to any convenient part of the gun. The switch and rheostat 22 will be located on the gun at a point convenient to the hand of the shooter so that lamp 20 may be instantaneously switched on and off as desired. A short section of tubing 56 fits within aligned apertures in casing 10 and portion 25 and acts to seal the parts against the entrance of dust. This section is, of course, aligned with hole 31.

The operation will be clear from the foregoing description. When shooting is to be done under conditions of poor visibility, switch 22 is closed and an image of the reticle 19 is projected by light from lamp 20, lens 18 and reflector 17 onto partial reflector 16. The shooter, looking through the telescope at the target, sees the illuminated image of the reticle superposed upon the target and is thus enabled to accurately aim the gun under conditions in which the reticle 14 might not be clearly visible.

In Figures 7 and 8 is shown a modification which operates upon the principles disclosed in Figure 1 and includes a sleeve 57 attachable by means of threads 58 to the ocular end of telescope casing 59. In this modification the lamp, auxiliary reticle, lens and reflector are mounted within a casing 60, shown as rectangular in cross section. A forward bracket 61 embraces the casing 60 and is secured to the sleeve 57 at diametrically opposite sides thereof by screws 62. A clamp, generally identified by the numeral 63 consists of halves 64 and 65 which, when drawn together by four clamping screws 66 firmly unite casings 59, 60 and sleeve 57. A screw 67 and cover plate 68 are connected with a reticle frame, not shown, so that the reticle may be axially adjusted in the manner previously described in connection with Figure 4. Electrical connection with the lamp in casing 60 may be made by the conductor 69 and plug connector 70. The operation of this form of the invention is the same as described in connection with Figures 2 to 6.

Thus it will be seen that I have provided an attachment for sighting to be used when conditions of light and background are such that it is difficult to locate the intersection of the cross-hairs of the telescope. The device in no way interferes with the use of the regular cross-hairs of the telescope, and may be quickly turned on to afford a clearly discernible sighting reticle having an adjustable intensity. The attachment is rugged, small in size and adds negligible weight to a gun equipped therewith. While I have shown the auxiliary casing on top of the telescope, this is not necessary. Such casing may have any position about the axis of the telescope so long as the major axis of reflector 29 lies in the plane determined by the parallel axes of the main and auxiliary housings. In this way, the attachment may be easily adapted to a telescope mounted upon any type of weapon without interfering with any of the operating parts thereof. The device is waterproof and the lamp 20 may be easily replaced by removal of cap 52 and screw 50.

The various patterns of reticles shown in

Figures 9, 10, 11 and 12 are self-explanatory. The form shown at Figure 10 may consist of short lines making equal intercepts upon two mutually normal hair lines, each intercept subtending a definite distance at a predetermined range, such range being the one at which the firearm is most effective or is most commonly used. In this way various leads may be accurately established.

While I have shown the preferred form of my invention, together with a modification thereof, numerous changes and substitutions of equivalents will be obvious to those skilled in the art. Therefore, the foregoing disclosure is to be taken as illustrative only and not in a limiting sense and I desire to reserve all such changes, alterations, modifications and substitutions as fall within the scope of the subjoined claim.

Having now fully disclosed the invention, what I claim and desire to secure by Letters Patent is:

In an attachment for a sighting telescope, a first sleeve adapted to form the ocular end of said telescope and to be attached to said telescope as an axial extension thereof, said sleeve having a rearwardly-facing internal annular shoulder between its ends, an objective lens fitting within said sleeve against said shoulder, first and second tube sections fitting said first sleeve and having confronting edges defining a plane at 45° to the common axis of said sleeve and telescope, a partial reflector interposed between and engaged on opposite sides about its periphery by said edges, a collar threaded into the ocular end of said sleeve and operable to engage said first tube section to force both said sections axially whereby said second section holds said lens against said shoulder and said sections act to clamp said partial reflector between them, a second sleeve secured in offset relation to and parallel with, said first sleeve, there being a passageway for light between said sleeve in a transverse plane through said partial reflector and a second plane through the parallel axes of said sleeves normal to said partial reflector, and means in said second sleeve and including a reflector, lens, reticle and lamp, for projecting an illuminated image of said reticle onto the rearward face of said partial reflector through said passageway.

JOHN R. DECKER.

REFERENCES CITED

The following references are of record in the file of this patent:

UNITED STATES PATENTS

| Number | Name | Date |
|---|---|---|
| 232,309 | Smith | Sept. 14, 1880 |
| 1,834,017 | Carbonara | Dec. 31, 1931 |
| 2,384,507 | Thurlow | Sept. 11, 1945 |
| 2,431,666 | Fassin | Nov. 25, 1947 |

FOREIGN PATENTS

| Number | Country | Date |
|---|---|---|
| 20,773 | Germany | Jan. 30, 1883 |
| 9,072 | Great Britain | 1900 |
| 2,852 | Great Britain | 1902 |
| 21,086 | Great Britain | 1911 |
| 265,222 | Germany | Oct. 6, 1913 |
| 15,708 | Great Britain | 1915 |
| 495,264 | France | June 24, 1919 |
| 396,493 | Germany | June 13, 1924 |